No. 609,361. Patented Aug. 16, 1898.
S. G. McKEAN.
MECHANICAL MOVEMENT.
(Application filed Jan. 14, 1897.)
(No Model.)
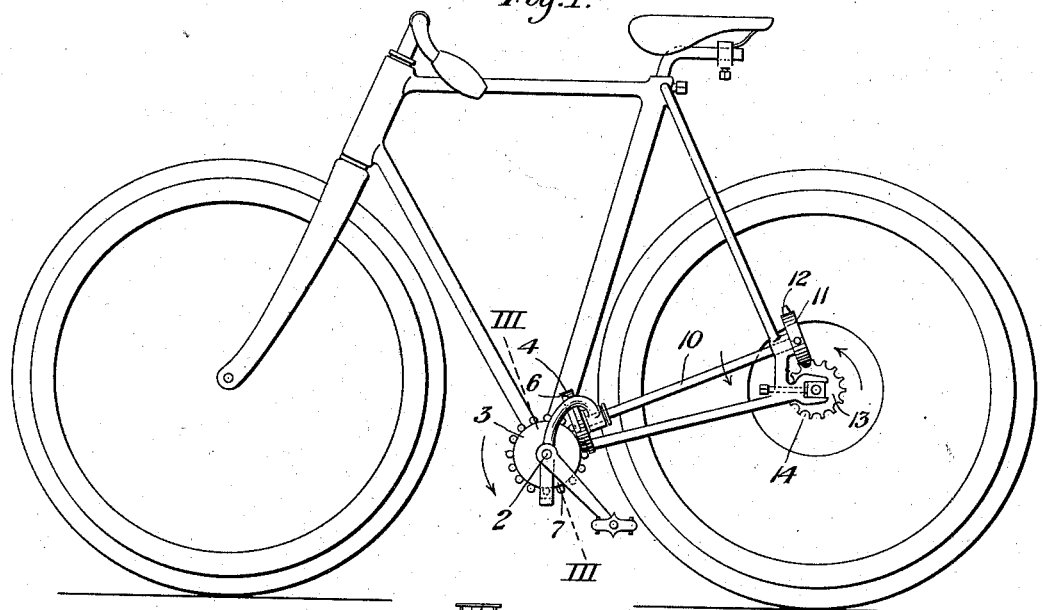
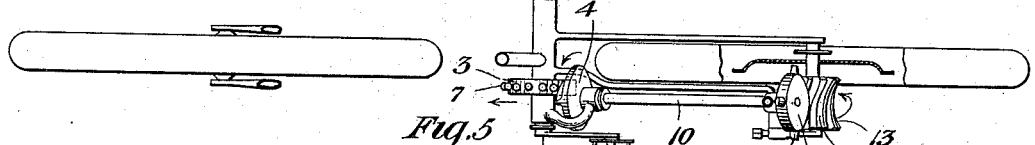
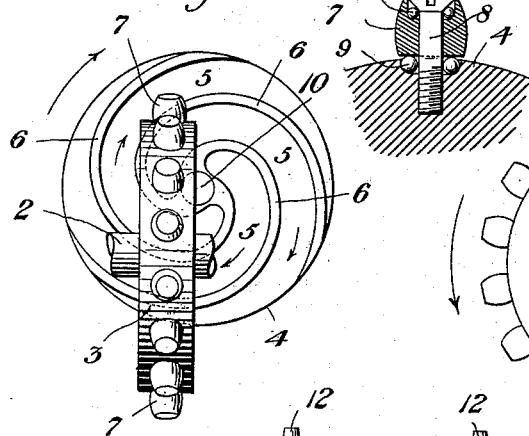
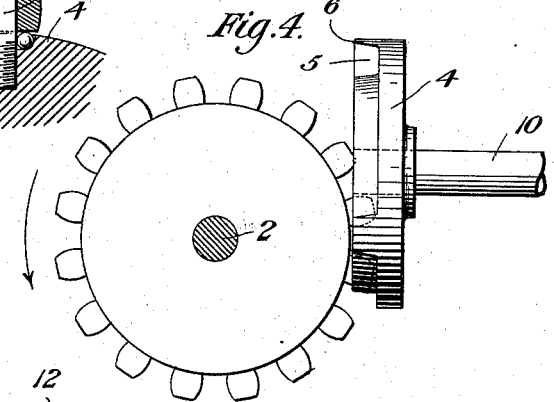
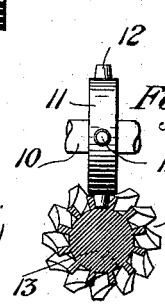
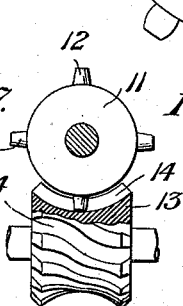
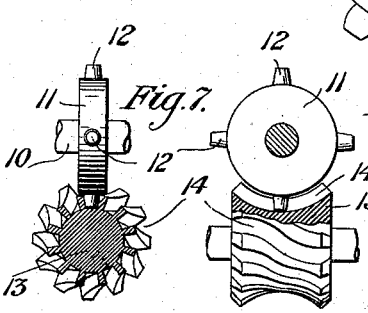
Witnesses:
Geo. B. Parker.
S. A. Clarke
Inventor:
Samuel G. McKean
by O. M. Clarke
his Attorney.

UNITED STATES PATENT OFFICE.

SAMUEL G. McKEAN, OF PITTSBURG, PENNSYLVANIA, ASSIGNOR OF ONE-HALF TO FREDERICK INGERSOLL AND LE GRAND INGERSOLL, OF SAME PLACE.

MECHANICAL MOVEMENT.

SPECIFICATION forming part of Letters Patent No. 609,361, dated August 16, 1898.

Application filed January 14, 1897. Serial No. 619,208. (No model.)

*To all whom it may concern:*

Be it known that I, SAMUEL G. MCKEAN, a citizen of the United States, residing at Pittsburg, in the county of Allegheny and State of Pennsylvania, have invented or discovered a new and useful Improvement in Mechanical Movements, of which the following is a full, clear, and exact description, reference being had to the accompanying drawings, forming part of this application, in which—

Figure 1 is a view in side elevation of a bicycle provided with my improved power-transmitting gearing. Fig. 2 is a plan view thereof, the frame of the bicycle having been removed. Fig. 3 is a detail view on an enlarged scale. Fig. 4 is a similar detail view at right angles to Fig. 3. Fig. 5 is a detail sectional view of one of the ball-bearing contact-rollers. Figs. 6 and 7 are detail views, partly in section, of the rear driving mechanism.

My invention consists of an improved mechanism for transmitting power from a prime mover to a point of application by the use of the various parts, which I shall now describe.

In its construction and use the mechanical movement or movements which I have devised are applicable to a wide variety of use, and I have shown in the present case the mechanism as applied to a bicycle, although it is suitable to other purposes and uses, as will suggest themselves to the skilled mechanic. In its application to a bicycle the revolution of a pedal-equipped crank-shaft is designed to transmit motion to the back driving-wheel through the other elements of the construction in the following manner:

Upon the crank-shaft 2 is mounted the primary power-wheel 3, and in close proximity thereto, with its axial center at right angles to that of the wheel 3 and to one side of its longitudinal center, is a driven wheel 4, the adjacent face of which is furnished with spiral grooves 5 in the form of involutes, with intervening ridges 6 conforming to the lines of the involute and maintaining a parallel relation to each other throughout from their roots to the periphery of the wheel 4. Between the ridges 6, as has been said, are the grooves 5, sufficiently deep to admit of the entrance of a series of rollers 7, mounted and equally spaced around the edge of the power-wheel 3. I prefer to provide each roller 7 with an extended screw-threaded stem 8, inserted in suitable sockets in the edge of the wheel 3 and provided with ball-bearings 9 to reduce friction. When mounted in relation to each other, as shown in the drawings, at least two of the rollers 7 will be in engagement with the grooves 5 at one time. When power is applied to rotate the wheel in the direction of the arrow, the rollers will bear against the ridges 6, thereby exerting a leverage on the wheel to one side of the center and at the same time bearing against the ridge 6 at an angle and resulting in the rotation of the wheel in the direction of the arrow, the rollers riding through the advancing grooves inwardly toward the center, constantly exerting a pressure upon the ridges 6 without losing the advantage of purchase by reason of slipping through the grooves. In this manner all dead-centers are avoided and the engaging rollers 7 will ride into and out of the grooves in an easy frictionless action, resulting in the rapid rotation of the wheel 4. A shaft 10 is keyed in the wheel 4 and transmits rotary motion back to a wheel 11, upon the edge of which is a series of rollers 12, similar to the rollers 7 and likewise mounted in ball-bearings.

A longitudinally-grooved wheel 13, having a concave periphery, is secured to the rear-wheel shaft, arranged at right angles to the wheel 11, the grooves 14 of which are arranged somewhat spirally and at an angle to its longitudinal center.

The grooves 14 are closely adjacent and of a width and depth to receive one of the rollers 12, which in the rotation of the wheel 11 will enter at one end and traverse the groove throughout its length, emerging from the other side.

The deflection of the grooves 14 from axial alinement is just sufficient to bring the next succeeding roller into register with the next groove, due to the rotation of the wheel 13 by action of the roller 12 against the walls of the groove, so that the operation of so rotating it is continuous as long as the wheel 11 is rotated.

If desirable, the rollers of the driving-wheel 11 may be made to engage in grooves made in the internal face of a suitably-flanged driven wheel, and in this manner the leverage will be increased, whereby the mechanism may be adapted to peculiar or special cases of work. In this manner it will be seen that motion is transmitted to the rear-wheel axle at a high speed through the mechanism I have described without the use of chains or connecting-rods. The evils of torsion and friction arising from the use of bevel-gearing are avoided, and the transmission of power is simple and direct and with a minimum amount of friction.

I am aware of the constructions disclosed in United States Patent No. 219,706, in British Patents Nos. 2,890 of 1878 and 1,262 of 1879, and in German Patent No. 46,058, and desire to disclaim the same.

Having described my invention, what I claim is—

1. The combination of a driven wheel provided with a series of involute flanges and intervening grooves extending from the periphery to the center of the driven wheel, a driving-shaft at right angles to the axial center of the driven wheel, means for applying power to the shaft, and a driving-wheel secured to the shaft provided with a series of rounded rollers 7 regularly arranged upon its periphery mounted on stems 8 secured to the wheel, substantially as set forth.

2. The combination of a driven wheel provided with a series of involute flanges and intervening grooves extending from the periphery to the center of the driven wheel, a driving-shaft at right angles to the axial center of the driven wheel, means for applying power to the shaft, and a driving-wheel secured to the shaft provided with a series of rounded rollers 7 regularly arranged upon its periphery mounted on stems 8 secured to the wheel, with intervening ball-bearings 9 in suitable recesses in the face of the wheel, substantially as set forth.

3. The combination of a power-wheel provided with a series of rounded rollers mounted with ball-bearings on its periphery, a driven wheel mounted at right angles to the axial center of such power-wheel provided with a series of involute flanges extending from the periphery to the center of the driven wheel with intervening grooves in which the rollers engage, and a concave spirally-grooved wheel mounted on the shaft of a driven machine, a driving-wheel alining with its longitudinal center provided with rounded rollers on its periphery engaging the grooves of the driven wheel, and a connecting-shaft secured to the involute wheel and such driving-wheel respectively, substantially as set forth.

In testimony whereof I have hereunto set my hand this 11th day of January, 1897.

SAMUEL G. McKEAN.

Witnesses:
C. M. CLARKE,
GEO. B. PARKER.